(No Model.)  3 Sheets—Sheet 1.
L. LOCKWOOD.
GRAIN SEPARATOR AND CLEANER.
No. 311,904. Patented Feb. 10, 1885.
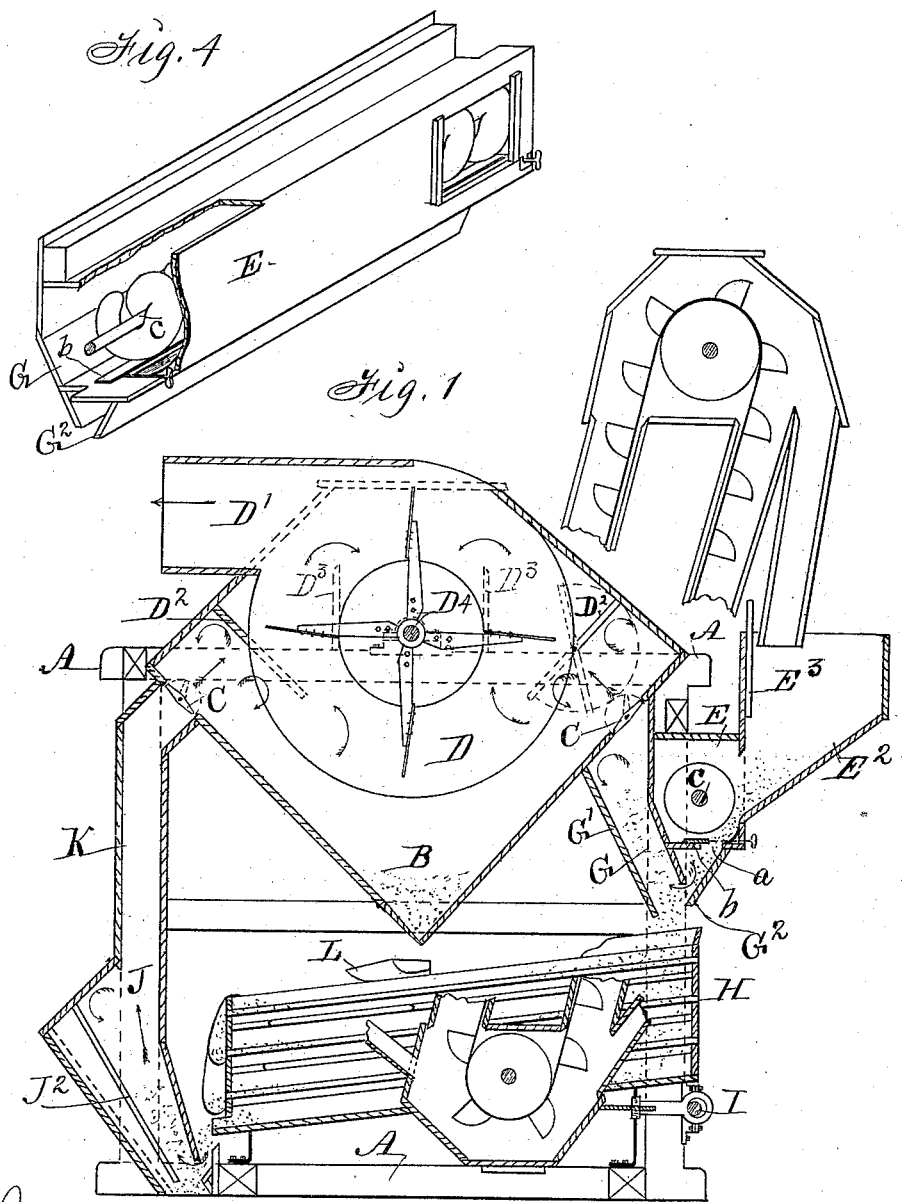

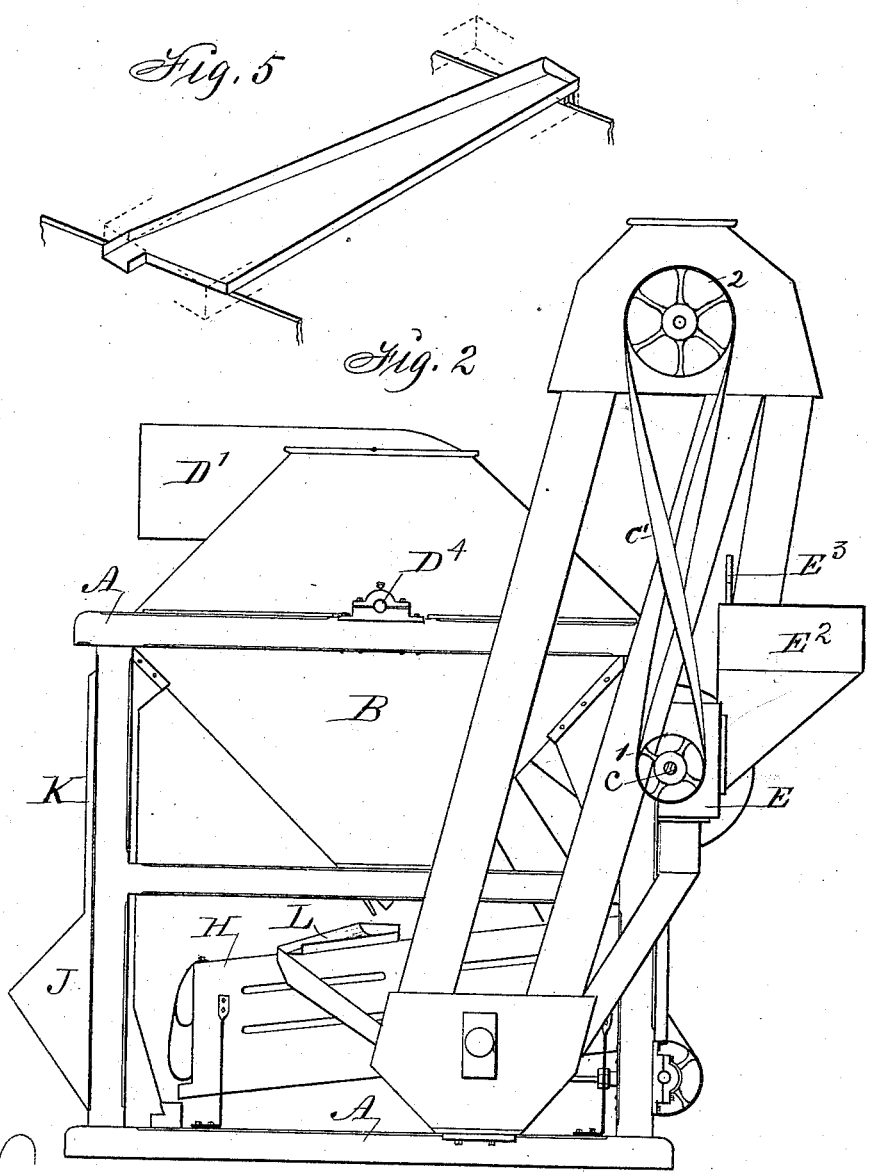

(No Model.)  3 Sheets—Sheet 3.
L. LOCKWOOD.
GRAIN SEPARATOR AND CLEANER.
No. 311,904.  Patented Feb. 10, 1885.
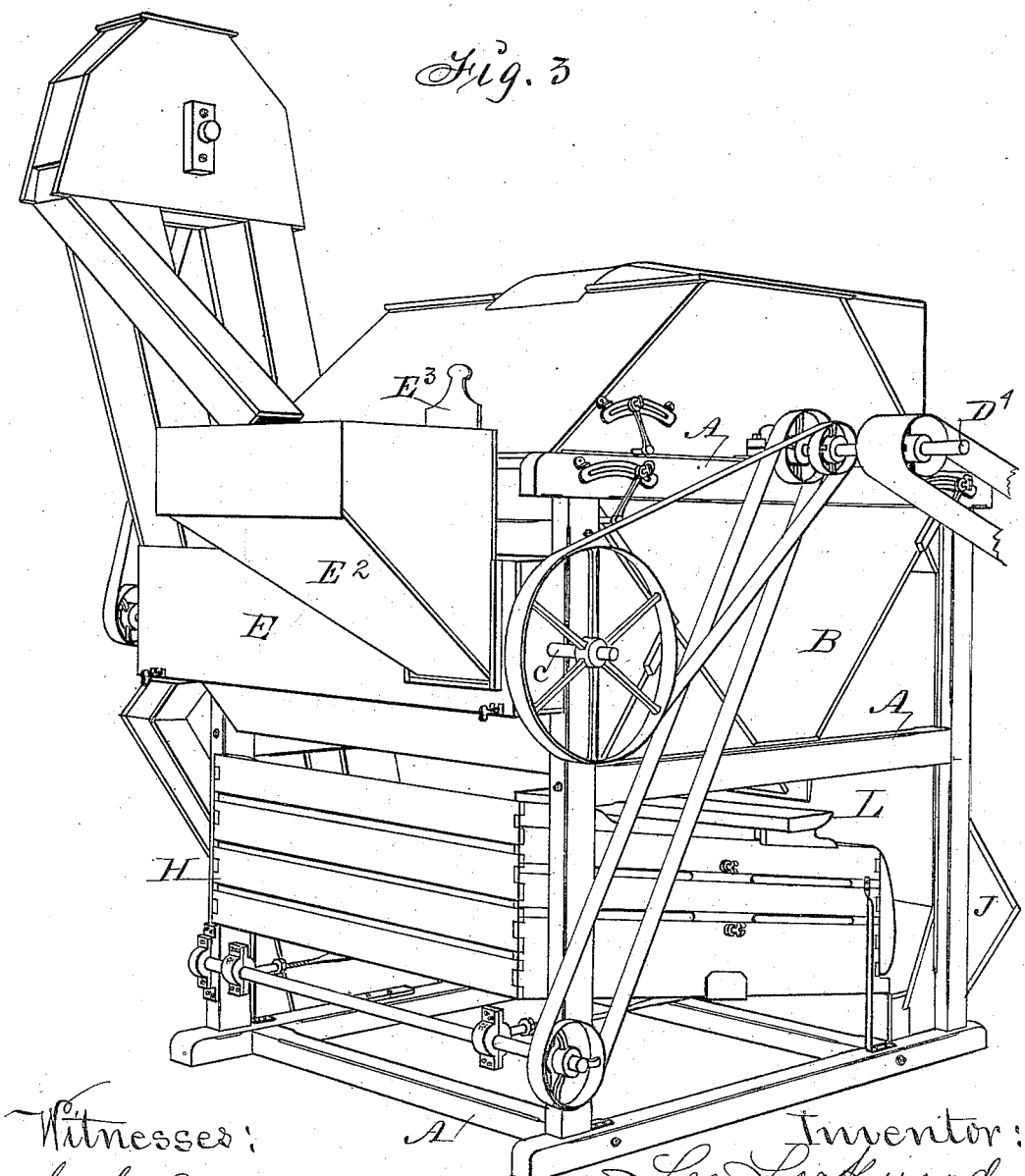

UNITED STATES PATENT OFFICE.

LEE LOCKWOOD, OF DES MOINES, IOWA.

GRAIN SEPARATOR AND CLEANER.

SPECIFICATION forming part of Letters Patent No. 311,904, dated February 10, 1885.

Application filed May 12, 1884. (No model.)

*To all whom it may concern:*

Be it known that I, LEE LOCKWOOD, of Des Moines, in the county of Polk and State of Iowa, have invented an Improved Grain Separator and Cleaner, of which the following is a specification.

The object of my invention is to provide a separator that is specially adapted to be used in a grain-elevator and automatically operated to rapidly separate different kinds of grain and grass seeds and clean the same in large quantities in very brief spaces of time, as required, to facilitate the operations of grain-merchants and to save time, labor, and expense in handling and properly preparing, grading, and cleaning different kinds of grain to command the best market prices.

Figure 1 of the accompanying drawings is a vertical section of my complete machine, showing the forms and relative positions of the different parts. Fig. 2 is a side elevation showing the driving mechanism. Fig. 3 is a perspective view of my machine. Fig. 4 is a perspective view of the feed-box. Fig. 5 is a perspective view of the grain-conveying spout. Jointly considered, these figures clearly illustrate the construction and operation of my complete invention.

A represents a frame and the base of my machine, to which all the operative elements are attached. It is preferably made of wood, and may vary in size as desired. It can be permanently fixed in an elevator-building, or made portable with a view of moving the machine about.

B is a combined hopper and fan-case, of quadrangular form, fixed in the open top of the frame A in such a manner that one of its corners will extend down into the central portion of the frame, to produce two converging planes upon which grain or seeds entering from opposite sides of the hopper will descend.

C C are openings in the top portions of the converging sides of the hopper, through which imperfect light seeds and other light substances are drawn in by the operation of a fan located within the hopper. Suitable adjustable valves are so placed relative to these openings C in the hopper that the suction force of the fan can be readily regulated thereby to adapt it to various kinds and conditions of grain.

D is a fan-case of circular form, fixed in the top and center of the angular hopper B.

D' is an open tube, that serves as an escape-passage for the air, chaff, and other light foreign substances drawn into the hopper and lifted to its top by the action of the fan.

$D^2$ are grain cut-offs in the form of plain pieces of board or sheet metal, fixed within the hopper to the upwardly-converging sides of its roof in such a manner as to extend downward in parallel positions with the converging hopper-bottom at some distance from the openings C, as required, to arrest the upward flight of grain or seeds and cause them to drop downward in the hopper.

$D^3$ are cut-offs fixed to the walls of the opposite sides of the circular fan-case D and on opposite sides of the circular openings in said walls, in such a manner that they will extend laterally to the end walls of the hopper and vertically in the side walls of the fan-case, to arrest any imperfect, light, but valuable seeds that might be elevated sufficiently in the air-current to escape with the waste material if not arrested by these cut-offs.

$D^4$ is the fan-shaft, mounted in bearings attached to the horizontal top pieces of the frame A. Power and motion may be applied to this shaft in any suitable way.

E is my feed-box, fixed in a horizontal position to the end of the frame A at a point some distance below the opening C in the hopper B.

$E^2$ is a hopper fixed to the outside of the box E. Its bottom inclines to the bottom of the feed-box, and an opening in the front of the feed-box admits grain to pass inward from the hopper. The flow of the grain is readily regulated by means of a slide, $E^3$, that can be adjusted to enlarge or diminish the passage-way between the seed-box and the hopper.

*a* is a continuous slot in the bottom of the feed-box. *b* is an adjustable slide by means of which the width of the slot *a* and the flow of the grain are regulated.

*c* is the shaft of a screw or worm conveyer, that extends through the feed-box and is rotated by means of pulleys 1 and 2 and a belt, *c'*, extending from the fan-shaft $D^4$. Each revolution of the screw will move a certain quantity of grain and feed it down through the slot $a$ in the feed-box, as required, to produce a uniform and continuous flow of grain from the feed-box to the separating and cleaning mechanism.

G is an air-chamber and grain and wind passage-way formed and fixed between the hopper and the feed-box, in such a manner as to cover the opening C in the hopper and terminate immediately under the feed-box, and also in such a manner that the inclined wall of the hopper will serve as a cut-off to arrest heavy grain or seeds that may be drawn upward therein, while the bottom and side G' of the air-chamber will direct the same back to its open bottom and into the current of grain moving downward from the feed-box toward a series of screens.

$G^2$ is an inclined plane fixed to the bottom of the feed-box, to direct the grain from the feed-box through the open end and mouth of the air-chamber, to subject it to the suction force of the fan as it falls toward a screen below, as required, to separate chaff and light matter from the good grain.

H is a vibrating frame adapted to support a series of detachable and interchangeable screens. It is suspended in the base and frame A in such a manner that the screens placed therein will incline downward from below the feed-box to the opposite side of the frame, as required, to shake, screen, and convey grain. Vibratory motion is imparted to the suspended frame and screens in a common way by means of eccentrics on a shaft, I, that is connected with the fan-shaft by means of a belt and pulleys.

J is an air-chamber corresponding in form with the chamber G, and fixed to the frame A, contiguous to the lower end of the vibrating frame H and its screens, in such a manner that the current of grain dropping from the lower screen will fall through the open mouth of the air-chamber J and be subjected to the suction force and draft produced by the action of the fan through the medium of a spout, K, that extends from the top of the air-chamber into the opening C of the hopper B and connects the air-chamber with the hopper and fan.

$J^2$ represents an adjustable slide in the chamber J, for regulating the draft to suit light or heavy grain.

By means of this second air-chamber J the grain passing through the separator is a second time subjected to the action of the fan, to take out any remaining imperfect light seeds or dirt and subject such matter a second time to the unitary action of the fan and hopper, while the sound and perfect seeds or grain are dropped into a spout or conveyer, to be delivered into a bin or other suitable receptacle.

L represents a chute fixed under the hopper B in such a manner that it will receive the unclean and imperfect grain that is gathered into and dropped from its bottom and convey it laterally over the screens into a receptacle or into an elevator, as indicated in Fig. 1, to be emptied into the hopper of the feed-box and again passed through the machine. The construction of the chute L is clearly shown in Fig. 5.

By means of the adjustable slides connected with the feed-box and a series of screens adapted for various kinds of grain, wheat, corn, oats, grass, or any kind of small grain or seed may be successively cleaned by passing it through the machine and subjecting it to the action of the fan and screens, as hereinbefore set forth.

From the detailed description of the construction, application, and function of each element and sub-combination of my separator, the unitary actions of all the operative parts and the practical automatic operating of the complete invention is obvious and will be readily understood by persons familiar with the construction and operation of grain-separators.

I claim as my invention—

1. In a grain-separator and grain-cleaning machine, the hopper B, having openings C on its opposite sides, the fan-case D D', the cut-offs $D^2$ and $D^3$, and a rotary fan within the fan-case and hopper, arranged and combined with a feed-box connected with the opening C at one side of the hopper, a spout extending down from the opening C at the opposite side of the hopper, and a vibrating screen carrying a chute under the center of the hopper, substantially as shown and described.

2. The combination of the hopper B, having openings C on opposite sides, the fan-case D, having a rotary fan inclosed, the cut-offs $D^2$ and $D^3$, a feed-box connected with one of the openings C and a spout with the other, a vibrating screen under the hopper, and the air-chambers G and J, substantially as shown and described.

3. The combination of the feed-box E, having a continuous slot, $a$, in its bottom, the adjustable slide $b$, a conveyer, $c$, an air-chamber, G, a hopper, B, having an opening, C, and a fan-case and fan inclosed within the hopper, substantially as shown and described.

4. The herein-described grain separator and cleaner, comprising the base or frame A, hopper B, having openings C C, the fan-case and fan, cut-offs $D^2$ and $D^3$, the feed mechanism E $E^2$ $E^3$, the box E thereof, having slot $a$, slide $b$, and rotating conveyer $c$, the air-chambers G J, and vibrating screen-carrier H, substantially as shown and described.

LEE LOCKWOOD.

Witnesses:
REES H. PARRY, Jr.,
B. C. LOCKWOOD.